United States Patent
Bothien et al.

(10) Patent No.: US 9,261,278 B2
(45) Date of Patent: Feb. 16, 2016

(54) METHOD FOR OPERATING A COMBUSTION DEVICE DURING TRANSIENT OPERATION

(71) Applicant: ALSTOM Technology Ltd, Baden (CH)

(72) Inventors: Mirko Ruben Bothien, Zurich (CH); Martin Zajadatz, Küssaberg/Dangstetten (DE); Douglas Anthony Pennell, Windisch (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 295 days.

(21) Appl. No.: 13/683,061

(22) Filed: Nov. 21, 2012

(65) Prior Publication Data
US 2013/0125547 A1    May 23, 2013

(30) Foreign Application Priority Data
Nov. 23, 2011 (EP) .................................. 11190244

(51) Int. Cl.
F23R 3/28     (2006.01)
F02C 9/26     (2006.01)
F23N 1/00     (2006.01)
F23N 5/24     (2006.01)
F23R 3/36     (2006.01)

(52) U.S. Cl.
CPC ... *F23R 3/28* (2013.01); *F02C 9/26* (2013.01); *F23N 1/00* (2013.01); *F23N 5/242* (2013.01); *F23R 3/36* (2013.01); *F05D 2270/31* (2013.01); *F23N 2041/20* (2013.01)

(58) Field of Classification Search
CPC .............. F23R 3/28; F23R 3/36; F23N 5/242; F23N 2041/20; F02C 9/26; F02C 9/40; F05D 2270/31

USPC .......... 60/722, 772, 773, 39.281, 39.24, 793, 60/734, 737, 740, 243, 233; 431/12
See application file for complete search history.

(56) References Cited

U.S. PATENT DOCUMENTS

| 4,716,719 A | 1/1988 | Takahashi et al. |
| 5,899,073 A | 5/1999 | Akimaru |

(Continued)

FOREIGN PATENT DOCUMENTS

| CN | 1156786 A | 8/1997 |
| CN | 101311630 A | 11/2008 |

(Continued)

OTHER PUBLICATIONS

European Search Report issued on Feb. 29, 2012 for Application No. 11190244.1.
Office Action issued on Apr. 29, 2015 by the Russian Patent Office in corresponding Russian Patent Application No. 2012149944, and an English Translation of the Office Action. (10).

(Continued)

*Primary Examiner* — J. Gregory Pickett
(74) *Attorney, Agent, or Firm* — Buchanan Ingersoll & Rooney PC

(57) ABSTRACT

A method and apparatus are disclosed for operating a combustion device during a transient operation. The combustion device is fed with at least a fuel. The transient operation includes a period having a period length (T) during which the fuel is fed in an amount lower that a designated (e.g., critical) amount (Mc). A limit value (L) is defined for the period length (T), and fuel feed is regulated to keep the period length (T) smaller or equal to the limit value (L).

16 Claims, 3 Drawing Sheets

(56) References Cited

U.S. PATENT DOCUMENTS

| | | | |
|---|---|---|---|
| 6,082,095 | A | 7/2000 | Akimaru |
| 7,730,726 | B2 | 6/2010 | Asti et al. |
| 2004/0025512 | A1* | 2/2004 | Davis et al. ............... 60/39.281 |
| 2006/0213200 | A1* | 9/2006 | Critchley et al. .......... 60/39.281 |
| 2006/0218929 | A1 | 10/2006 | Murakami |
| 2008/0098746 | A1 | 5/2008 | Iasillo et al. |
| 2008/0164474 | A1 | 7/2008 | Yamazaki et al. |
| 2008/0289339 | A1 | 11/2008 | Asti et al. |
| 2009/0133379 | A1* | 5/2009 | Mendoza et al. .......... 60/39.281 |
| 2009/0249792 | A1 | 10/2009 | Guethe et al. |
| 2010/0146984 | A1 | 6/2010 | Carroni et al. |
| 2010/0186366 | A1 | 7/2010 | Doyle et al. |
| 2010/0192577 | A1 | 8/2010 | Singh et al. |
| 2012/0102967 | A1* | 5/2012 | Kirzhner et al. ................ 60/773 |

FOREIGN PATENT DOCUMENTS

| | | |
|---|---|---|
| DE | 10160907 A1 | 8/2003 |
| EP | 2107227 A1 | 10/2009 |
| EP | 2213863 A2 | 8/2010 |
| EP | 2213941 A2 | 8/2010 |
| SU | 1028949 A1 | 7/1983 |

OTHER PUBLICATIONS

Office Action (First Office Action) and Search Report issued on Jan. 29, 2015, by the State Intellectual Property Office of People's Republic of China in corresponding Chinese Patent Application No. 201210481471.X and an English Translation of the Office Action and Search Report. (14 pages).

* cited by examiner

METHOD FOR OPERATING A COMBUSTION DEVICE DURING TRANSIENT OPERATION

RELATED APPLICATION

This application claims priority under 35 U.S.C. §119 to European Patent Application No. 11190244.1 filed in Europe on Nov. 23, 2011, the entire content of which is hereby incorporated by reference in its entirety.

TECHNICAL FIELD

The present disclosure relates to a method for operating a combustion device during transient operation.

BACKGROUND

In the following discussion, reference to combustion devices that are part of a gas turbine is made; it will, however, be clear to those skilled in the art that the method can also be implemented in combustion devices for different applications.

A gas turbine can include a compressor, a combustion device and a turbine.

Combustion devices are known to include a body with:
 a fuel supply for either a liquid fuel (for example, oil) or a gaseous fuel (for example, natural gas), and
 an oxidiser supply (for example, air).

During operation, the fuel and the oxidiser react within the combustion device and generate high pressure and temperature flue gases that are expanded in the turbine.

During transient operation, such as for example when the gas turbine is started up, switched off, during fuel switch over or also during other transient operations, problems can occur.

In fact, during these transient operations fluctuating pressure can generate within the combustion device; this fluctuating pressure can adversely influence fuel injection.

FIG. 1 shows an effect of the fluctuating pressure within the combustion device on the fuel injection. This FIG. 1 shows an example in which the fuel mass flow is reduced; this could be an example of a switch off. However, the same or similar conditions would also be present at the beginning of a start up or at the beginning and end of a switch over, and in general, each time the fuel mass flow supplied decreases and falls below a given mass flow.

FIG. 1 shows the fuel mass flow M injected through an injector as a function of time t. From FIG. 1 at least the following phases can be recognised:
 before t=t1: steady operation with substantially constant fuel mass flow through the injector (curve 1);
 between t=t1 and t=t2 (the fuel mass flow stays above a designated (e.g., critical) fuel amount Mc): the amount of fuel injected decreases, but the fluctuating pressure within the combustion device does not perceptibly affect fuel injection (curve 2);
 after t=t2 (e.g., when the fuel mass flow falls below a critical fuel amount Mc): in these conditions, since the amount of fuel is low, the fluctuating pressure within the combustion device alternatively promotes and hinders fuel injection, causing a fluctuating fuel injection. For example, curve 2 shows a theoretical run of the reducing fuel mass flow, and curve 3 an example of a possible real run of the reducing fuel mass flow.

Fluctuating fuel supply into the combustion device generates large combustion pulsations.

Combustion pulsations largely mechanically and thermally can stress the combustion device and the turbine downstream of it, and therefore would desirably be counteracted.

SUMMARY

A method is disclosed for operating a combustion device during transient operation, comprising: feeding the combustion device with a fuel during a transient operation which includes a period having a period length (T) during which the fuel is fed in an amount lower than a designated amount (Mc); defining a limit value (L) for the period length (T); and regulating fuel feed to keep the period length (T) smaller or equal to the limit value (L).

An apparatus is also disclosed comprising: a fuel combustion device; and a fuel feed regulator for feeding the combustion device with a fuel during a transient operation which includes a period having a period length (T) during which the fuel is fed in an amount lower than a designated amount (Mc); defining a limit value (L) for the period length (T); and for regulating fuel feed to keep the period length (T) smaller or equal to the limit value (L).

BRIEF DESCRIPTION OF THE DRAWINGS

Further characteristics and advantages will be more apparent from the description of exemplary preferred, but non-exclusive, embodiments of the method, illustrated by way of non-limiting examples with reference to the accompanying drawings, in which.

DETAILED DESCRIPTION

The present disclosure includes a method by which combustion pulsations generated during transient operation can be counteracted.

A method for operating a combustion device during transient operation can be implemented with any kind of combustion device, for example a combination device adapted to generate a premixed flame, a diffusion flame, a mixed flame, etc. The combustion device can be fed with one or more fuels.

Figure 1:
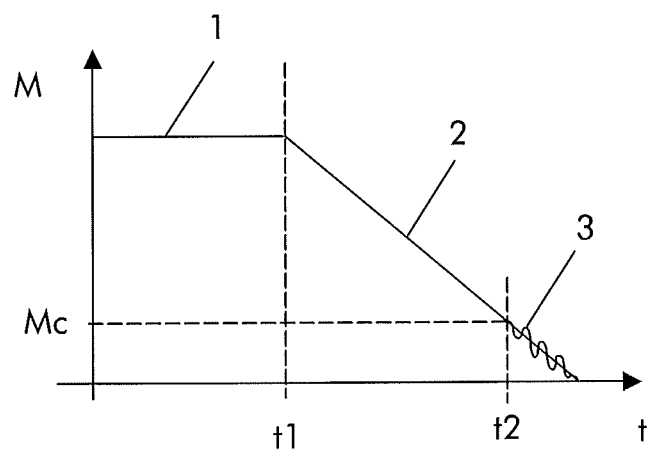
FIG. 1 schematically shows an exemplary mass flow injected into a combustion device as a function of time t.
Figure 2:
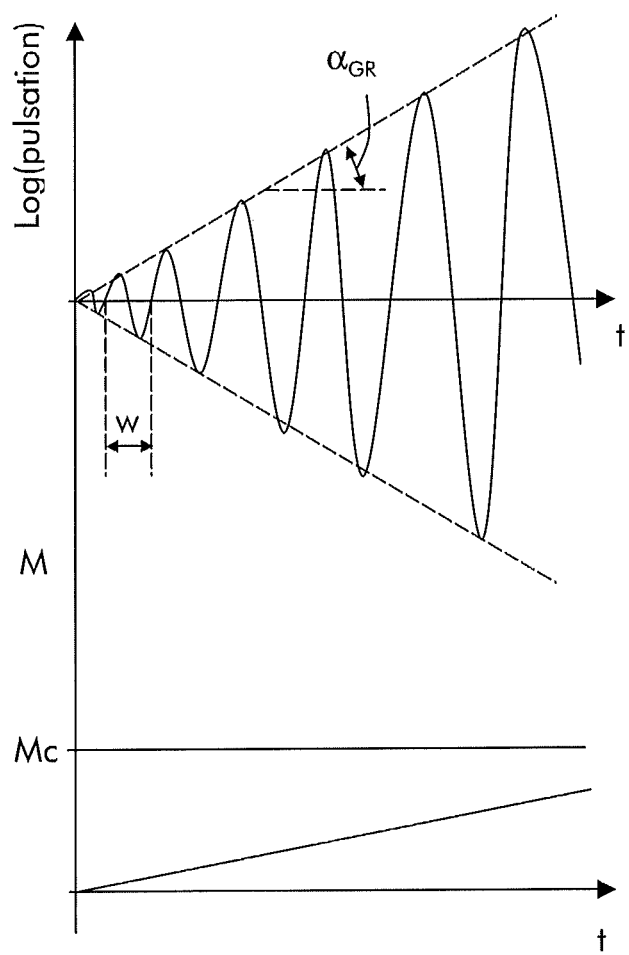
FIG. 2 shows an exemplary relationship between pulsations (pressure) and mass flow fed into a combustion device when the fed mass flow is below Mc.

FIG. 2 shows pulsations generated in a combustion device when a fuel mass flow M fed into the combustion device increases (from 0 onwards) but it is smaller than a designated (e.g., critical) amount Mc; in this case pulsations have an increasing intensity. The run of the pulsations and the limit value fuel amount are characteristic for each combustion device and do not substantially change when operating conditions change. In other words, the critical amount Mc is, for example, an amount at which substantial pulsations start to occur (e.g., pulsations which are above operating limits for continuous operation and which can endanger safe operation of the engine).

Figure 3:
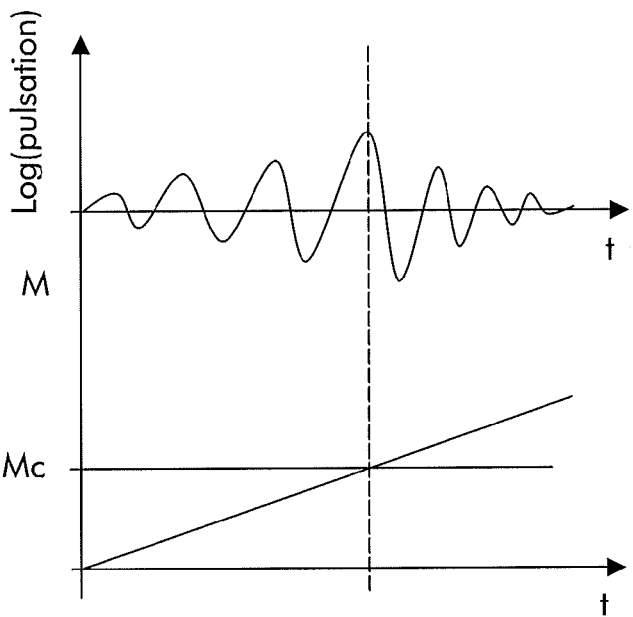
FIG. 3 shows an exemplary relationship between pulsations (pressure) and mass flow fed into a combustion device when the fed mass flow overcomes Mc.

As shown in FIG. 3, when the fuel mass flow M reaches the critical fuel amount Mc, pulsation intensity starts to decrease up to a minimum. The critical amount Mc can be reached faster or slower according to the fuel feed conditions.

Figure 4:
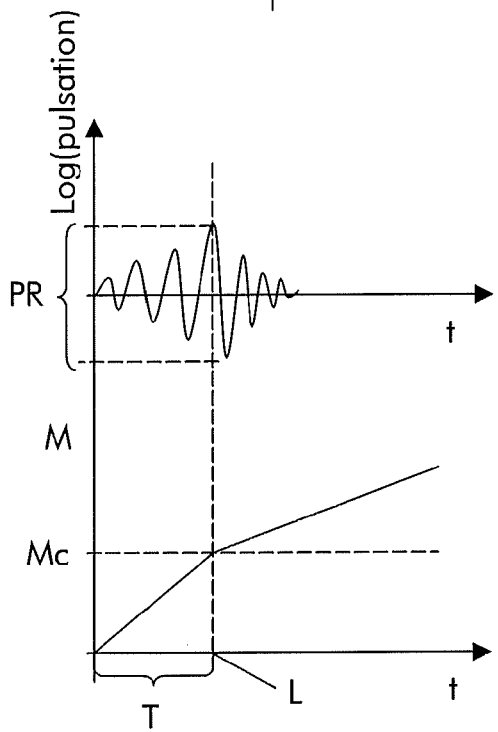
FIGS. 4 and 5 show an exemplary relationship between pulsation (pressure), time and mass flow fed into a combustion device according to different embodiments of the disclosure.

With reference to FIG. 4, the transient operation includes a period having period length T during which the fuel is fed in an amount lower than the critical fuel amount Mc.

The method includes defining a limit value L for the period length T, and regulating the fuel feed to keep the period length T smaller or equal to the limit value L.

Figure 5:
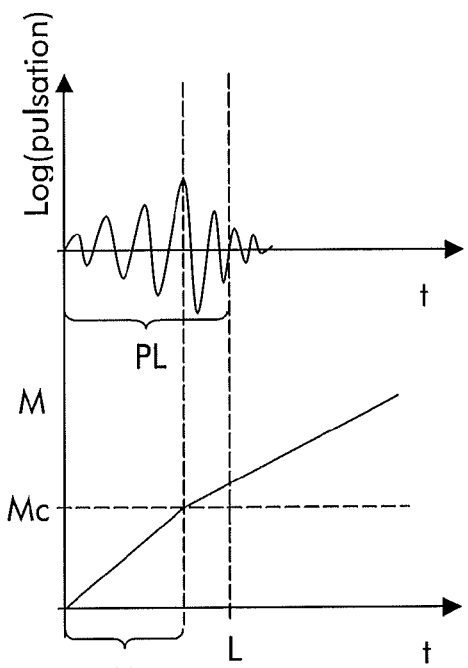

In this respect, FIG. 4 shows an example in which the period length T is equal to L, and FIG. 5 an example in which the period length T is smaller than L.

L can be defined, for example, on the basis of the maximum pulsation intensity and/or maximum period length for the pulsations, that can be accepted in the combustion device. For example:
- the maximum acceptable pulsation intensity can be limited within a pulsation range PR and the limit value L can be defined accordingly (FIG. 4); and/or
- the maximum acceptable period length PL during which the pulsations are generated in the combustion device can be given and the limit value can be defined accordingly (FIG. 5).

A parameter that is a function of the period length T and fed fuel can, for example, be provided, and the limit value L for the period length T defined as a limit value for this parameter. In this case, regulating the fuel feed includes preventing the parameter from overcoming the limit value for the parameter.

In an exemplary embodiment of the method, the parameter is defined by:

$$Bo = (\alpha_{GR} \cdot T)/(2\pi \cdot \Delta\beta)$$

wherein
$\alpha_{GR}$ is an averaged linear growth rate in a period length T (it depends on characteristics of the combustion device, operating conditions, fuel, ambient conditions) and can be calculated by $$\text{pulsation} \sim A \cdot e^{(\alpha_{GR} \cdot t)}$$

and thus $$\log(\text{pulsation}) \sim B + \alpha_{GR} \cdot t$$

for example $\alpha_{GR}$ is shown at FIG. 2;
T is the period length;
$\beta$ is the energy content of the fuel (or one of the fuels if more than one fuel is injected) divided by the energy content of the total supplied fuel (or fuels if more than one fuel is injected); wherein the energy content of a fuel is, for example:

energy content of a fuel=mass flow·lower heating value $\Delta\beta = \text{abs}(\beta 2 - \beta 1)$ is the difference of $\beta$ in T.

In some cases it could be difficult calculating $\alpha_{GR}$, and for this reason $\alpha_{GR}$ can be approximated by:

$$\alpha_{GR} = f_{osc}/(2\pi)^2$$

wherein
$f_{osc}$ is the mean oscillation frequency during the period length T in the range $\Delta\beta$, with:

$$f_{osc} = 1/w,$$

wherein:
w is the averaged period of the pulsations in the combustion device (FIG. 2).

In the exemplary embodiments above, the limit value is $\pi$.
Thus Bo calculated with $\alpha_{GR}$ being either the averaged linear growth rate or approximated by $\alpha_{GR} = f_{osc}/(2\pi)^2$ should be smaller than the limit value (such as $\pi$) and, if $\alpha_{GR}$ can be calculated in both cases, both values of $\alpha_{GR}$ should be smaller that the limit value (such as $\pi$).

The use of a parameter such as Bo that is a function of both the period length T and fed fuel can be advantageous, because it allows for taking into account not only the period length T, but also the speed with which the critical mass flow Mc is reached. In other words Bo provides a minimum limit on the feed speed of the fuel, such that a larger speed is acceptable but a slower speed is not.

Figure 6:
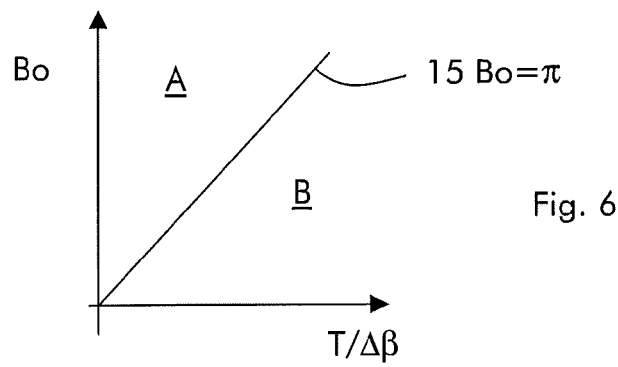
FIG. 6 shows an exemplary relationship between Bo and T/Δβ.

FIG. 6 shows a relationship between Bo (calculated, for example, according to any of the formulas provided above) and $T/\Delta\beta$ (that is indicative of the feed speed of the fuel). In FIG. 6, curve 15 is relative to the limit value Bo=$\pi$; curve 15 defines two areas, namely:
- an area A that is relative to values of $T/\Delta\beta$ (thus values of the feed speed of the fuel) that can be accepted; and
- an area B that is relative to values of $T/\Delta\beta$ (thus values of the feed speed of the fuel) that can not be accepted.

In different examples the transient operation can be a start up of the combustion device, a switch off of the combustion device or a switch over from operation of the combustion device with a first fuel to operation with a second fuel. In this case the first fuel can be a liquid fuel and the second fuel can be a gaseous fuel or vice versa.

Figure 7:
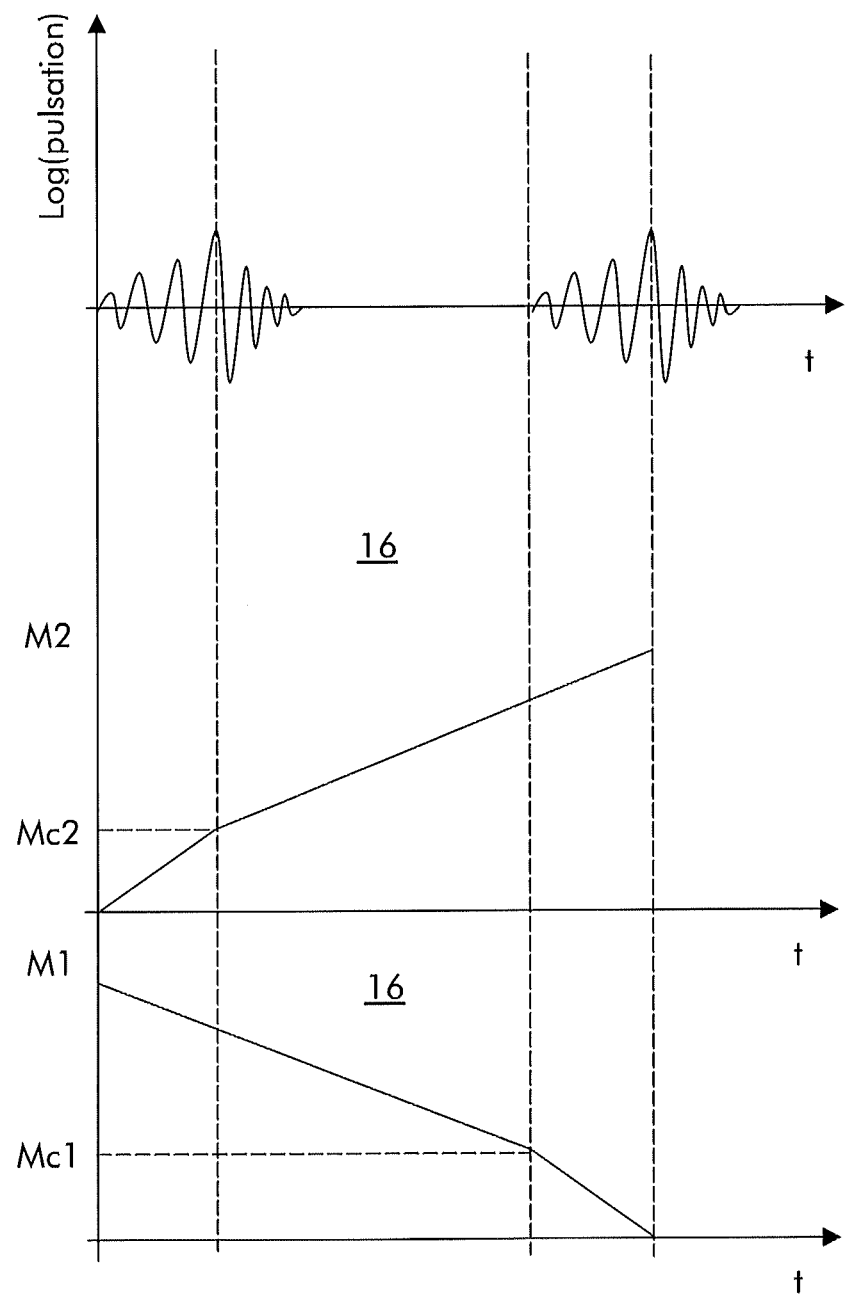
FIG. 7 shows an example of a switch over.

FIG. 7 shows an example in which the transient operation is a switch over from operation with a first fuel to operation with a second fuel. In this Figure M1 refers to the mass flow of the first fuel, and M2 to the mass flow of the second fuel, and Mc1 and Mc2 to designated (e.g., critical) amounts of the first and second fuel.

From this Figure, it can be seen that troubling operation can occur:
- at beginning of the switch over, when the mass flow M2 of the second fuel is lower that its critical amount Mc2; and
- at the end of the switch over, when the mass flow M1 of the first fuel falls below its critical amount Mc1.

In this case the limits for the period length T and/or Bo should only be provided at the beginning and at the end of the switch over and the fuel feed should be regulated accordingly.

In contrast, when the mass flow of the first and second fuel is larger than the critical amounts Mc1, Mc2 (e.g., in zone 16 of FIG. 7), the regulation can be controlled on the basis of different specifications (e.g., requirements), such as for example load regulation (for example to keep it constant).

The combustion device can, for example, be a part of a gas turbine.

Regarding a limit for the parameter Bo:
- the maximum peaks of pulsation can be reduced, because the shorter the transient operation time length, the smaller the pulsation peaks;
- the time during which the pulsations stress the combustion device can be reduced.

Numerical Example of a Start Up

In the following discussion, an exemplary start up of a gas turbine with a gas flow is described.

The following exemplary data apply:

$\alpha_{GR} = 1$ rad/s $\beta 1$ (energy content of the fuel at the beginning of the period T divided by the energy content of the total supplied fuel): 0

$\beta 2$ (energy content of the fuel supplied at the end of the period T divided by the energy content of the total supplied fuel, supposing that at the end of the period T it is injected 10% of gas fuel): 0.1

$$\Delta\beta = abs(\beta 2 - \beta 1) = 0.1$$

period T: 1.5 seconds with these values $Bo=(1\cdot 1.5)/(2\pi\cdot 0.1)=2.39$

Since Bo=2.39<π the fuel injection speed at start up is acceptable.

Numerical Example of a Switch Over

In the following discussion, a switch over of a gas turbine from gas operation to oil operation is for example described. The following exemplary data apply:
beginning of the switch over:

$$\alpha_{GR} = 4\ rad/s$$

β1 (energy content of the fuel (gas) at the beginning of the period T divided by the energy content of the total supplied fuel): 1

β2 (energy content of the fuel (gas) supplied at the end of the period T divided by the energy content of the total supplied fuel, supposing that at the end of the period T it is injected 5% of oil fuel and 95% of gas fuel): 0.095 (assuming the same heating value for oil and gas)

$$\Delta\beta = abs(\beta 2 - \beta 1) = 0.05$$

period T: 0.2 seconds with these values $Bo=(4\cdot 0.2)/(2\pi\cdot 0.05)=2.55$

Since Bo=2.55<π this fuel injection speed can be accepted; and
end of the switch over:

$$\alpha_{GR} = 8\ rad/s$$

β1 (energy content of the fuel (gas) at the beginning of the period T divided by the energy content of the total supplied fuel, (e.g., oil and gas fuel), supposing that at the beginning of the period T 95% is oil fuel and 5% is gas fuel): 0.05

β2 (energy content of the fuel (gas) supplied at the end of the period T divided by the energy content of the total supplied fuel supplied, supposing that at the end of the period T 100% is oil fuel and 0% is gas fuel): 0

$$\Delta\beta = abs(\beta 2 - \beta 1) = 0.05$$

period T: 0.25 seconds with these values $Bo=(8\cdot 0.25)/(2\pi\cdot 0.05)=6.37$ Since Bo=6.37>π this fuel injection speed can not be accepted; thus the fuel injection speed should thus be increased.

If for example T is reduced (i.e. the fuel injection speed is increased or in other words fuel is injected with a higher flow rate) to 0.1 seconds $$Bo = (8\cdot 0.1)/(2\pi\cdot 0.05) = 2.55$$

Since Bo=2.55<π this fuel injection speed can be accepted.
Naturally the features described may be independently provided from one another.

In practice the materials used and the dimensions can be chosen at will according to desired specifications, and to the state of the art.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMBERS

1 fuel mass flow at steady operation
2 fuel mass flow above Mc
3 fuel mass flow below Mc
15 curve indicative of Bo=π
16 zone
t,t1,t2 time
w averaged period of the pulsations in the combustion device
L limit value for T
A, B area
M,M1,M2 fuel mass flow
Mc,Mc1,Mc2 critical amount
T period length
Bo parameter
PL maximum acceptable period length
PR maximum acceptable pulsation range
$\alpha_{GR}$ averaged linear growth rate (in the period T) of the fuel during the change Δβ
Δβ=β1−β2 is the difference of β in β, where β is the current mass flow of the fuel divided by the total mass flow at full load

The invention claimed is:

1. A method for operating a combustion device during transient operation, comprising:
   feeding the combustion device with a fuel during a transient operation which includes a period having a period length (T) during which the fuel is fed in an amount lower than a designated amount (Mc), where the designated amount (Mc) is an amount below which pulsations start to occur at a level above an operating limit of the combustion device;
   defining a limit value (L) for the period length (T); and
   regulating fuel feed to keep the period length (T) smaller or equal to the limit value (L).

2. The method of claim 1, wherein the transient operation is a switch over from operation with a first fuel to operation with a second fuel.

3. The method of claim 2, wherein the first fuel is a liquid fuel and the second fuel is a gaseous fuel or vice versa.

4. The method of claim 1, wherein the combustion device is a part of a gas turbine.

5. A method for operating a combustion device during transient operation, comprising:
   feeding the combustion device with a fuel during a transient operation which includes a period having a period length (T) during which the fuel is fed in an amount lower than a designated amount (Mc);
   defining a limit value (L) for the period length (T);
   regulating fuel feed to keep the period length (T) smaller or equal to the limit value (L);
   providing a parameter (Bo) that is a function of the period length (T) and fed fuel (Δβ); and
   defining the limit value (L) for the period length (T) as a limit value for the parameter; and
   wherein the regulating of the fuel feed and period length (T) comprises:
      preventing the parameter (Bo) from overcoming the limit value for the parameter.

6. The method of claim 5, wherein the parameter (Bo) is defined by:

$$Bo = (\alpha_{GR} \cdot T)/(2\pi \cdot \Delta\beta)$$

wherein
- $\alpha_{GR}$ is an averaged linear growth rate of fuel during a fuel feed change $\Delta\beta$;
- T is a period length for the fuel feed $\Delta\beta$;
- $\beta$ is an energy content of one fuel divided by an energy content of a total supplied fuel;
- $\Delta\beta = abs(\beta2-\beta1)$ is the difference of $\beta$ in T.

7. The method of claim 6, wherein $\alpha_{GR}$ is approximated by:

$$\alpha_{GR} = f_{osc}/(2\pi)^2$$

wherein
- $f_{osc}$ is a mean oscillation frequency during a period in a range of the fuel feed $\Delta\beta$.

8. The method of claim 6, wherein the limit value is $\pi$.

9. The method of claim 5, wherein the transient operation is a switch over from operation with a first fuel to operation with a second fuel.

10. The method of claim 9, wherein the first fuel is a liquid fuel and the second fuel is a gaseous fuel or vice versa.

11. The method of claim 5, wherein the combustion device is a part of a gas turbine.

12. A fuel feed regulator for feeding a combustion device during transient operation, the regulator configured to:

feed the combustion device with a fuel during a transient operation which includes a period having a period length (T) during which the fuel is fed in an amount lower than a designated amount (Mc), where the designated amount (Mc) is an amount below which pulsations start to occur at a level above an operating limit of the combustion device;

define a limit value (L) for the period length (T); and regulate fuel feed to keep the period length (T) smaller or equal to the limit value (L).

13. The fuel feed regulator of claim 12, wherein the regulating of the fuel feed and period length (T) comprises:

preventing the parameter (Bo) from overcoming the limit value for the parameter; and the fuel feed regulator is further configured to:

provide a parameter (Bo) that is a function of the period length (T) and fed fuel ($\Delta\beta$); and define the limit value (L) for the period length (T) as a limit value for the parameter.

14. The fuel regulator of claim 12, wherein the transient operation is a switch over from operation with a first fuel to operation with a second fuel.

15. The fuel regulator of claim 14, wherein the first fuel is a liquid fuel and the second fuel is a gaseous fuel or vice versa.

16. The fuel regulator of claim 12, wherein the combustion device is a part of a gas turbine.

* * * * *